Sept. 21, 1926.

J. H. PHILIPS 1,600,842

ELECTROSTATIC APPARATUS

Filed Sept. 5, 1923  2 Sheets-Sheet 1

Inventor:
James H. Philips,
by *[signature]*
His Attorney.

Inventor:
James H. Philips,
by *Alexander S. Lunt*
His Attorney.

Patented Sept. 21, 1926.

1,600,842

UNITED STATES PATENT OFFICE.

JAMES HERBERT PHILIPS, OF PAULS VALLEY, OKLAHOMA, ASSIGNOR TO GENERAL ELECTRIC COMPANY, A CORPORATION OF NEW YORK.

ELECTROSTATIC APPARATUS.

Application filed September 5, 1922. Serial No. 681,073.

My present invention relates to apparatus for storing up energy in a dielectric machine and delivering it again from that medium to an electric circuit to produce a flow of current.

The object of my invention is to provide a simple form of apparatus whereby the operation of storing up energy in a dielectric and delivering it to an electric circuit may be carried on continuously.

My invention may be employed for a great variety of purposes as will be gathered from a consideration of the few general applications which will be hereinafter described.

Figure 1:
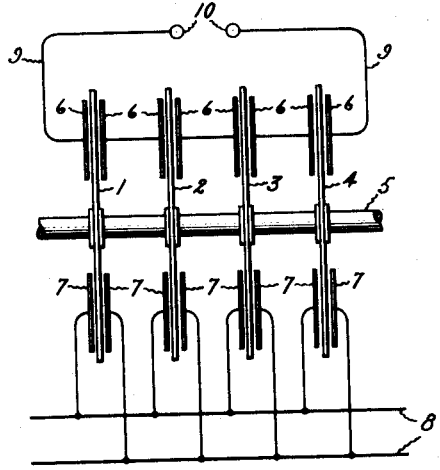
Figure 2:
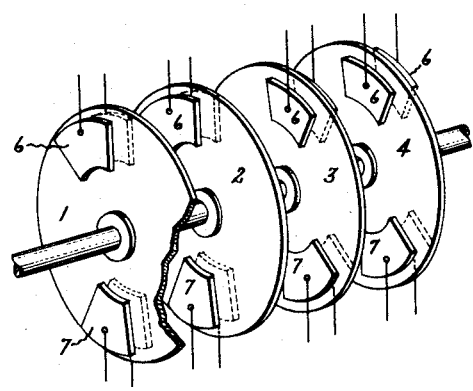
Figure 3:
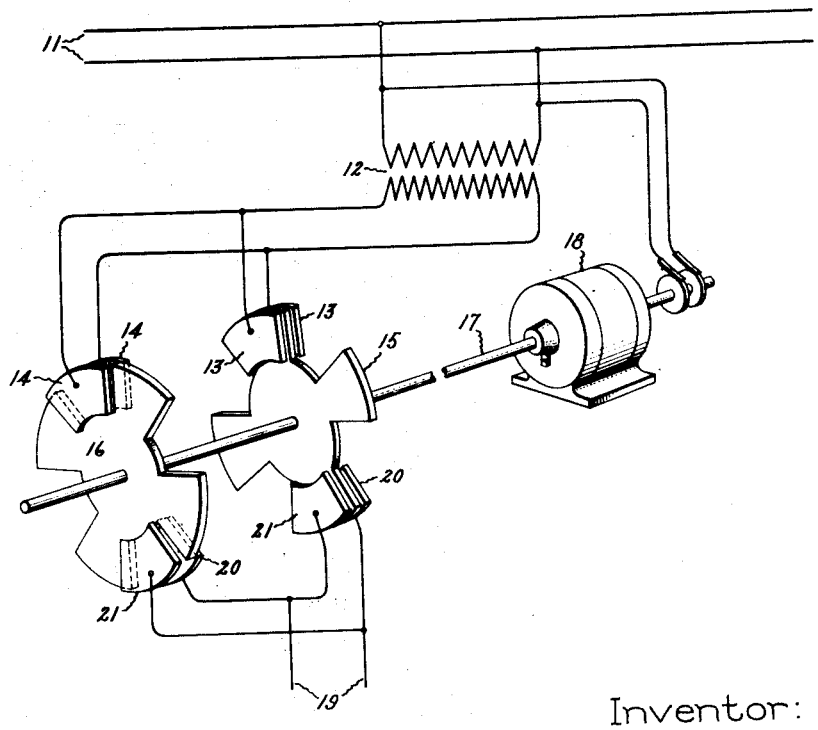
Figure 4:
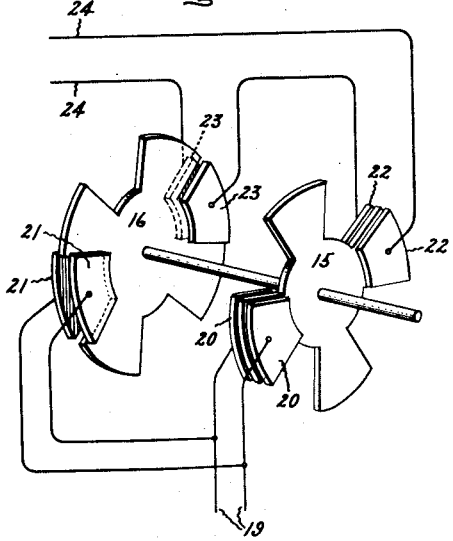
Figure 5:
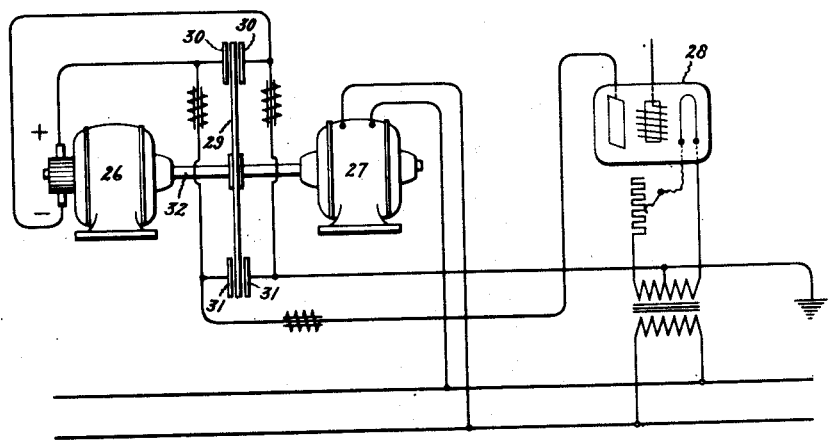

The novel features which I believe to be characteristic of my invention are set forth with particularity in the appended claims. My invention itself, however, will best be understood by reference to the following description taken in connection with the accompanying drawing in which Fig. 1 shows diagrammatically an apparatus and circuit connection for transforming direct current from one voltage to another; Fig. 2 is a partial perspective view of the apparatus of Fig. 1; Fig. 3 shows diagrammatically an apparatus and circuit connection for rectifying alternating current; Fig. 4 shows a further modification; and Fig. 5 shows an apparatus and circuit connection for smoothing out small periodic fluctuations in a desired current.

In all of the modifications of my invention which I have illustrated, I provide a disk of a suitable dielectric which is adapted to be rotated between sets of opposing electrodes located on opposite sides thereof. In Fig. 1, I have shown four such disks 1, 2, 3, and 4, which are mounted on a shaft 5. For each disk two sets of electrodes 6, 6, and 7, 7 are provided located diametrically opposite one another. The electrodes 7, 7 are connected in parallel to the opposite sides of a supply circuit consisting of conductors 8, 8 to which a source of direct current may be connected. The electrodes 6, 6 are connected in series with conductors 9, 9 which may supply current to any consumption device. If desired, a multi-polar arrangement may be employed using two, three or more sets of primary electrodes and a similar number of sets of secondary electrodes with spacing appropriate for the number of sets used.

When the disks 1, 2, 3, and 4 are rotated between electrodes 7, 7 energy from the supply circuit is stored up in these disks and when those portions of the disks which have passed between electrodes 7, 7 pass between electrodes 6, 6 the stored-up energy will be discharged into the circuits 9 and 10 to which the electrodes 6, 6 are connected. By reason of the parallel connections of electrodes 7, 7 and the series connection of electrodes 6, 6, however, the voltage applied to the circuit of electrodes 6, 6 will be greater than the voltage of the supply circuit 8, 8. It is also evident that the electrodes 6, 6 may be connected to the supply, and the electrodes 7, 7 to the output 10 thus decreasing the voltage. If the disks are rotated continuously the transfer of energy from one set of electrodes to the other will be continuous, and a continuous flow of current of substantially constant potential may be produced in the consumption circuit if desired.

In the arrangement shown in Fig. 3, alternating current to be rectified is supplied from distribution mains 11, 11 to a transformer 12, the secondary winding of which is connected to two sets of electrodes 13, 13 and 14, 14. Two toothed dielectric disks 15, 15 are mounted on a shaft 17, which is driven by a synchronous motor 18 supplied with current from the mains 11, 11. A direct current consumption circuit 19 is connected to the electrodes 20, 20 and 21, 21, as indicated. The disk 15 is so mounted upon shaft 17 that energy from one-half cycle of the alternating current is stored up in disk 15 and the disk 16 is so arranged that energy from the other half cycle of the alternating current is stored up therein. The electrodes 20, 20 and 21, 21 are oppositely connected to the direct current circuit so that the energy delivered by disks 15 and 16 to that circuit will produce a direct current flow. The amount of current rectified will of course depend upon the surface area of the dielectric and of the electrodes and the amount of rectified current may be increased by increasing the size of the disks or the number of disks employed or their speed and the frequency of alternations. In case additional pairs of disks are employed the different pairs may to advantage be slightly staggered with respect to one another to cause such an overlapping of the waves as will decrease the fluctuations in the direct current produced.

I have shown in Fig. 4 an arrangement which may be employed for stepping down the voltage at the same time that rectification takes place. In this case the two sets of electrodes 22, 22 and 23, 23 are connected in series to the supply mains 24 so that the potential of the supply mains is divided between the two sets and the voltage delivered from the electrodes 20 and 21 to the direct current circuit 19 will be only approximately half that which would be delivered with the parallel connections of Fig. 3.

In the system shown in Fig. 5, I have indicated a direct current generator 26 driven by an A C motor 27 for supplying direct current for the plate circuit of a vacuum tube 28. Difficulty is sometimes experienced in such cases by reason of small fluctuations in the direct current due to commutation. To overcome such disadvantages I provide a disk 29 which rotates between electrodes 30, 30 and 31, 31. This disk is mounted on the shaft 32, which drives the generator 26. The electrodes 30, which may have a width of approximately one-half the circular degree of a commutator segment on the generator, are so arranged that energy from the crest of the ripple in the direct current will be stored up in the disk 29 and the electrodes 31 are so located that this energy will be delivered to the direct current circuit in the trough of the ripple. In this way the fluctuations in the current may be greatly reduced.

What I claim as new and desire to secure by Letters Patent of the United States, is:—

1. In an apparatus of the class described, a pair of stationary electrodes, a solid dielectric adapted to be rotated between said electrodes, a source of potential connected to said electrodes, a second pair of stationary electrodes between which said dielectric may be rotated and a consumption circuit connected to said second pair of electrodes.

2. In an apparatus of the class described, a plurality of pairs of electrodes connected in parallel to an electric circuit, an equal number of pairs of electrodes connected in series in a second electric circuit and a plurality of dielectric bodies each of which is adapted to be moved between a pair of electrodes connected to the first circuit and a pair of electrodes connected to the second circuit.

3. In apparatus of the class described, a plurality of pairs of stationary electrodes connected in parallel to an electric circuit, an equal number of pairs of stationary electrodes connected in series in a second electric circuit and a plurality of dielectric bodies each of which is adapted to be moved between a pair of electrodes connected to the first circuit, and a pair of electrodes connected to the second circuit.

4. In an apparatus of the class described, a plurality of pairs of electrodes connected in parallel to an electric circuit, an equal number of pairs of electrodes connected in series in a second electric circuit and a plurality of dielectric bodies each of which is adapted to be rotated between a pair of electrodes connected to the first circuit and a pair of electrodes connected to the second circuit.

5. In an apparatus of the class described, a plurality of pairs of stationary electrodes connected in parallel to an electric circuit, an equal number of pairs of stationary electrodes connected in series in a second electric circuit and a plurality of dielectric bodies each of which is adapted to be rotated between a pair of electrodes connected to the first circuit, and a pair of electrodes connected to the second circuit.

6. In an apparatus of the class described, a pair of separated electrodes, a solid dielectric between said electrodes, a source of potential connected to said electrodes, a second pair of electrodes separated by said solid dielectric, a consumption circuit connected to said second pair of electrodes and means for producing continuous relative movement between said dielectric and both pairs of said electrodes.

7. The method of transferring electric energy from one circuit to another which consists in rotating a dielectric in inductive relation to both circuits.

In witness whereof, I have hereunto set my hand this 11 day of August, 1923.

JAMES HERBERT PHILIPS.